US012698157B2

(12) United States Patent
Zhou et al.

(10) Patent No.: US 12,698,157 B2
(45) Date of Patent: Aug. 4, 2026

(54) WAREHOUSING SYSTEM, GOODS COLLECTION METHOD AND DEVICE, GOODS-CONTAINER-MOVING DEVICE, AND CONTROL TERMINAL

(71) Applicant: HAI ROBOTICS CO., LTD., Shenzhen (CN)

(72) Inventors: Hongxia Zhou, Shenzhen (CN); Yuqi Chen, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 792 days.

(21) Appl. No.: 18/067,081

(22) Filed: Dec. 16, 2022

(65) Prior Publication Data

US 2023/0122873 A1     Apr. 20, 2023

Related U.S. Application Data

(63) Continuation of application No. PCT/CN2021/100462, filed on Jun. 16, 2021.

(30) Foreign Application Priority Data

Jun. 17, 2020     (CN) .......................... 202010553288.0

(51) Int. Cl.
*B65G 1/137*          (2006.01)

(52) U.S. Cl.
CPC ......... *B65G 1/1375* (2013.01); *B65G 1/1371* (2013.01)

(58) Field of Classification Search
CPC .. B65G 1/1375; B65G 1/1371; B65G 1/1373; B65G 1/1378; B65G 1/0485; Y02P 90/02; G06Q 10/087
See application file for complete search history.

(56) References Cited

U.S. PATENT DOCUMENTS

| | | | | |
|---|---|---|---|---|
| 9,129,250 B1 * | 9/2015 | Sestini | ................. | G06Q 10/087 |
| 2014/0100715 A1 * | 4/2014 | Mountz | ................ | B65G 1/1378 |
| | | | | 701/2 |
| 2019/0300285 A1 | 10/2019 | Cheng | | |

FOREIGN PATENT DOCUMENTS

| | | |
|---|---|---|
| CN | 101417732 A | 4/2009 |
| CN | 101966904 A | 2/2011 |

(Continued)

OTHER PUBLICATIONS

International Search Report for PCT/CN2021/100462.

(Continued)

*Primary Examiner* — Jacob S. Scott
*Assistant Examiner* — Erin Morris
(74) *Attorney, Agent, or Firm* — Ladas & Parry, LLP

(57)          ABSTRACT

A warehousing system including a shelving unit, a goods-container-moving device, and a control terminal. The shelving unit is provided with a plurality of storage spaces configured to place a storage-goods container or a collection-goods container, wherein the storage-goods container is configured to store goods; the control terminal is configured to send a first control instruction to the goods-container-moving device; the goods-container-moving device is configured to move a target storage-goods container storing target goods to a first picking area; the control terminal is further configured to obtain a free storage space on the shelving unit, and send a second control instruction to the goods-container-moving device; and the goods-container-moving device is further configured to temporarily store the collection-goods container that completes the picking of the target goods to the free storage space.

19 Claims, 6 Drawing Sheets

(56)              References Cited

FOREIGN PATENT DOCUMENTS

| | | | | | |
|----|----------------|----|---------|----------|-------------|
| CN | 102339426 | A  | 2/2012  | | |
| CN | 104555221 | A  | 4/2015  | | |
| CN | 105637544 | A  | 6/2016  | | |
| CN | 106956882 | A  | 7/2017  | | |
| CN | 106956883 | A  | 7/2017  | | |
| CN | 107226310 | A  | 10/2017 | | |
| CN | 107444824 | A  | 12/2017 | | |
| CN | 107555056 | A  | 1/2018  | | |
| CN | 207580617 | U  | 7/2018  | | |
| CN | 108482925 | A  | 9/2018  | | |
| CN | 108502429 | A  | 9/2018  | | |
| CN | 108584268 | A  | 9/2018  | | |
| CN | 109003021 | A  | 12/2018 | | |
| CN | 208233915 | U  | 12/2018 | | |
| CN | 109279252 | A  | 1/2019  | | |
| CN | 109292343 | A  | 2/2019  | | |
| CN | 109583800 | A  | 4/2019  | | |
| CN | 109911489 | A  | 6/2019  | | |
| CN | 109987369 | A  | * 7/2019 | .............. | B65G 1/04 |
| CN | 110092122 | A  | 8/2019  | | |
| CN | 110238066 | A  | 9/2019  | | |
| CN | 110406869 | A  | 11/2019 | | |
| CN | 110422543 | A  | 11/2019 | | |
| CN | 110436108 | A  | 11/2019 | | |
| CN | 110589340 | A  | 12/2019 | | |
| CN | 110606305 | A  | 12/2019 | | |
| CN | 110775496 | A  | 2/2020  | | |
| CN | 110980081 | A  | 4/2020  | | |
| CN | 210504200 | U  | 5/2020  | | |
| CN | 111217067 | A  | 6/2020  | | |
| CN | 210709076 | U  | 6/2020  | | |
| CN | 111573112 | A  | 8/2020  | | |
| CN | 212557863 | U  | 2/2021  | | |
| EP | 1627830 | A1 | 2/2006  | | |
| EP | 3653541 | A1 | * 5/2020 | ........... | B65G 47/905 |
| EP | 3971114 | A1 | * 3/2022 | ........... | B65G 1/0485 |
| JP | H07-97011 | A  | 4/1995  | | |
| JP | H0912116 | A  | 1/1997  | | |
| JP | 2000072102 | A  | 3/2000  | | |
| JP | 2002193409 | A  | 7/2002  | | |
| JP | 4927269 | B2 | 5/2012  | | |
| JP | 202083548 | A  | 6/2020  | | |
| JP | 2020083548 | A  | * 6/2020 | ........... | G06Q 10/087 |
| WO | WO-2016199033 | A1 | * 12/2016 | ........... | B65G 1/1378 |

OTHER PUBLICATIONS

The First Chinese Office Action dated Mar. 25, 2026 from corresponding Chinese Patent Appln. 202310301741.2, with search report.

* cited by examiner a target storage-goods container storing target goods in an order task is moved to a first picking area when a first control instruction sent by a control terminal based on the order task is received; the first picking area is an area in which the target goods are picked from the target storage-goods container to a collection-goods container

S120 when a second control instruction is received, the collection-goods container that completes the picking of the target goods is temporarily stored to a free storage space; the second control instruction is sent by the control terminal based on the free storage space in which no storage-good container or collection-goods container is currently placed on a shelving unit

Figure 4:
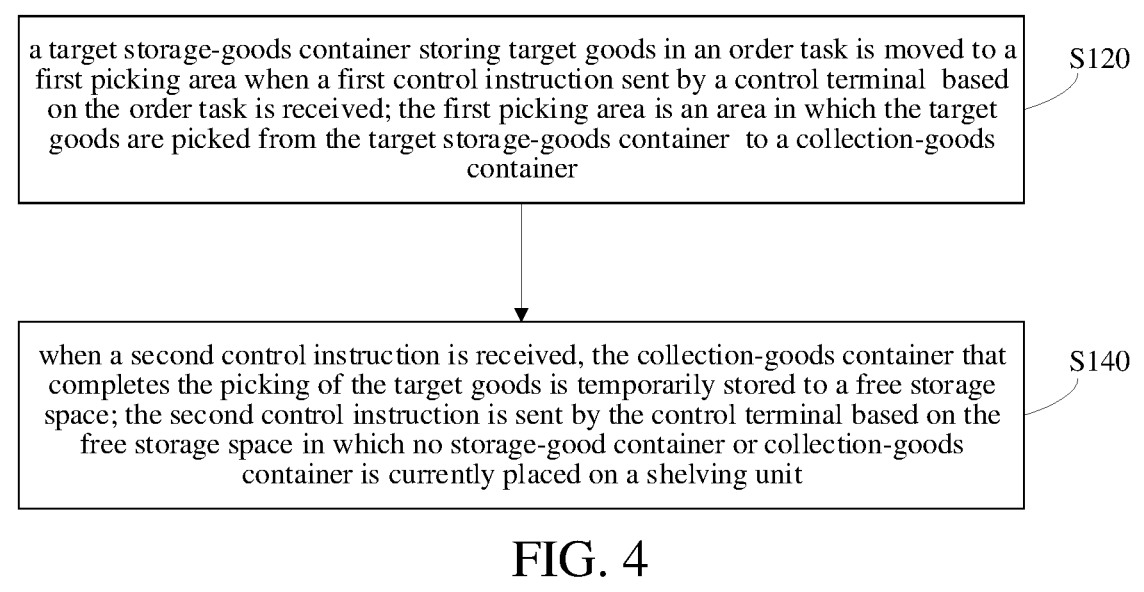

S140

FIG. 4 an order task including target goods is obtained, and a first control instruction is sent to a goods-container-moving device based on the order task; the first control instruction is configured to instruct the goods-container-moving device to move a target storage-goods container storing the target goods to a first picking area P1, and the first picking area is an area in which the target goods are picked from the target storage-goods container to a collection-goods container

S220 a free storage space in which no storage-goods container or collection-goods container is currently placed on a shelving unit is obtained, and a second control instruction is sent to the goods-container-moving device; the second control instruction is configured to instruct the goods-container-moving device to temporarily store the collection-goods container that completes the picking of the target goods to the free storage space

WAREHOUSING SYSTEM, GOODS COLLECTION METHOD AND DEVICE, GOODS-CONTAINER-MOVING DEVICE, AND CONTROL TERMINAL

CROSS-REFERENCE TO RELATED APPLICATIONS

This application is a continuation of International Patent Application No. PCT/CN2021/100462 filed on Jun. 16, 2021, which claims priority to Chinese Patent Application No. 202010553288.0, entitled "WAREHOUSING SYSTEM, GOODS COLLECTION METHOD AND DEVICE, GOODS-CONTAINER-MOVING DEVICE, AND CONTROL TERMINAL" filed with the China National Intellectual Property Administration on Jun. 17, 2020, which is incorporated by reference in its entirety.

TECHNICAL FIELD

The present disclosure relates to the field of warehouse collection technologies, and in particular, to a warehousing system, a goods collection method and device, a goods-container-moving device, a control terminal, and a storage medium.

BACKGROUND

With the development of society and the advancement of science and technology, the level of warehouse management is also constantly improved. A properly designed warehouse management system can help improve the efficiency of warehouse collection operations to meet the huge demand for goods collection.

In warehousing operations, picking refers to a process of taking out goods specified in an order task from the warehouse. The related method usually adopts a picking strategy of collecting goods first and then performing secondary sorting to improve the picking efficiency.

In the related picking strategy, it is necessary to set a specific temporary storage area or temporary shelving unit to temporarily store goods picked in the collection process. As a result, the warehouse resources are occupied. Moreover, due to the limited size of the specific area or shelving unit, the quantity of goods temporarily stored is limited, and thus the quantity of simultaneous order tasks is limited, which finally leads to low efficiency of warehouse collection operations.

SUMMARY

The present disclosure provides a warehousing system, a goods collection method and device, a goods-container-moving device, a control terminal, and a storage medium, to resolve the problem of low efficiency of warehouse collection operations in the related art.

According to an aspect, the present disclosure provides a warehousing system, including a shelving unit, a goods-container-moving device, and a control terminal. The shelving unit is provided with a plurality of storage spaces for placing storage-goods containers or collection-goods containers. The storage-goods container is configured to store goods.

The control terminal is configured to send a first control instruction to the goods-container-moving device.

The goods-container-moving device is configured to move a target storage-goods container storing target goods to a first picking area according to the first control instruction. The first picking area is an area in which the target goods are picked from the target storage-goods container to collection-goods containers.

The control terminal is further configured to obtain a free storage space in which no storage-goods container or collection-goods container is currently placed on the shelving unit, and send a second control instruction to the goods-container-moving device.

The goods-container-moving device is further configured to temporarily store the collection-goods containers that completes the picking of the target goods to the free storage spaces according to the second control instruction.

In some embodiments, the control terminal is further configured to obtain an order task including the target goods; and send the first control instruction to the goods-container-moving device based on the order task.

In some embodiments, each of the plurality of storage spaces on the shelving unit is correspondingly provided with an identifier.

The goods-container-moving device is further configured to obtain, after receiving the first control instruction, a first identifier of a target storage space storing the target storage-goods container, and send first notification information including the first identifier to the control terminal.

The control terminal is further configured to update a state of the storage space corresponding to the first identifier to a state of a free storage space according to the first notification information.

In some embodiments, the goods-container-moving device is further configured to obtain, after receiving the second control instruction, a second identifier of the free storage space, and send second notification information including the second identifier to the control terminal.

The control terminal is further configured to update a state of the free storage spaces corresponding to the second identifier to a state of a used storage spaces according to the second notification information.

In some embodiments, the goods-container-moving device is further configured to: send first query information to the control terminal after picking of any target goods is completed, where the first query information is configured to query a current state of the target storage space corresponding to the target storage-goods container that completes the picking of the target goods; receive current status information of the target storage space fed back by the control terminal based on the first query information; and move and place the target storage-goods container corresponding to the picked target goods in the target storage space in response to the target storage space being currently a free storage space; or the goods-container-moving device is further configured to: send second query information to the control terminal after picking of any target goods is completed, where the second query information is configured to query a free storage space on the shelving unit; receive information about the free storage space on the shelving unit fed back by the control terminal based on the second query information; and move and place a target storage-goods container corresponding to the picked target goods in the free storage space in response to there being a free storage space on the shelving unit.

In some embodiments, after the information about the free storage space on the shelving unit fed back by the control terminal based on the second query information is received, in response to there being at least two free storage spaces on the shelving unit, the goods-container-moving device is further configured to determine, based on the at least two free storage spaces on the shelving unit, a free storage space that meets a preset condition, and move and place the target storage-goods container in the free storage space that meets the preset condition.

The preset condition includes that a distance for the goods-container-moving device to move to the free storage space is the shortest, or a distance between the free storage space and the first picking area is the shortest.

In some embodiments, the control terminal is further configured to send a third control instruction to the goods-container-moving device after all target goods in the order task are picked.

The goods-container-moving device is further configured to move all the collection-goods containers containing the target goods to a second picking area according to the third control instruction.

In some embodiments, the goods-container-moving device is further configured to obtain, after receiving the third control instruction, a third identifier of the storage space temporarily storing the collection-goods containers containing the target goods, and send third notification information including the third identifier to the control terminal.

The control terminal is further configured to update a state of the storage spaces corresponding to the third identifier to a state of free storage space according to the third notification information.

According to another aspect, the present disclosure provides a goods collection method, the method is executed by a goods-container-moving device and includes: moving, when receiving a first control instruction sent by a control terminal based on an order task, a target storage-goods container storing target goods in the order task to a first picking area, where the first picking area is an area in which the target goods are picked from the target storage-goods container to a collection-goods containers; and temporarily storing, when receiving a second control instruction sent by the control terminal based on a free storage space in which no storage-goods container or collection-goods container is currently placed on a shelving unit, the collection-goods container that completes the picking of the target goods to the free storage space, where the free storage space is a storage space configured to place the storage-goods container or the collection-goods container on the shelving unit, and the storage-goods container is configured to store goods.

In some embodiments, the method further includes: obtaining, after receiving the first control instruction, a first identifier of target storage space storing the target storage-goods container, and sending first notification information including the first identifier to the control terminal, where the first notification information is used for instructing the control terminal to update a state of the storage spaces corresponding to the first identifier to a state of a free storage space.

In some embodiments, the method further includes: obtaining, after receiving the second control instruction, a second identifier of the free storage spaces, and send second notification information including the second identifier to the control terminal, where the second notification information is used for instructing the control terminal to update a state of the storage spaces corresponding to the second identifier to a state of a used storage space.

In some embodiments, the method further includes: sending first query information to the control terminal after picking of any target goods is completed, where the first query information is configured to query a current state of the target storage space corresponding to the target storage-goods container that completes the picking of the target goods; receiving current state information of the target storage space fed back by the control terminal based on the first query information; and moving and placing the target storage-goods container corresponding to the picked target goods in the target storage space in response to the target storage space being currently a free storage space; or sending second query information to the control terminal after picking of any target goods is completed, where the second query information is configured to query a free storage space on the shelving unit; receiving information about the free storage space on the shelving unit fed back by the control terminal based on the second query information; and moving and placing the target storage-goods container corresponding to the picked target goods in the free storage space in response to there being a free storage space on the shelving unit.

In some embodiments, the method further includes: after the information about the free storage space on the shelving unit fed back by the control terminal based on the second query information is received, in response to there being at least two free storage spaces on the shelving unit, determining, based on the at least two free storage spaces on the shelving unit, a free storage space that meets a preset condition, and moving and placing the target storage-goods container in the free storage space that meets the preset condition, where the preset condition includes that a distance for a goods-container-moving device to move to the free storage space is the shortest, or a distance between the free storage space and the first picking area is the shortest.

In some embodiments, the method further includes: moving, when receiving a third control instruction sent by the control terminal after all the target goods in the order task are picked, all the collection-goods containers containing the target goods to a second picking area.

In some embodiments, the method further includes: obtaining, after receiving the third control instruction, a third identifier of the storage space temporarily storing the collection-goods container containing the target goods, and sending third notification information including the third identifier to the control terminal, where the third notification information is configured to instruct the control terminal to update a state of the storage spaces corresponding to the third identifier to a state of a free storage space.

According to another aspect, the present disclosure provides a goods collection method, the method is executed by a control terminal and includes: obtaining an order task including target goods, and sending a first control instruction to a goods-container-moving device based on the order task, where the first control instruction is configured to instruct the goods-container-moving device to move target storage-goods container storing the target goods to a first picking area, and the first picking area is an area in which the target goods are picked from the target storage-goods container to a collection-goods container; and obtaining a free storage space in which no storage-goods container or collection-goods container is currently placed on a shelving unit, and sending a second control instruction to the goods-container-moving device, where the second control instruction is configured to instruct the goods-container-moving device to temporarily store the collection-goods container that completes the picking of the target goods to the free storage spaces, where the free storage space is a storage space configured to place the storage-goods container or the collection-goods container on the shelving unit, and the storage-goods container is configured to store goods.

In some embodiments, the method further includes: receiving first notification information that includes a first identifier and that is sent by the goods-container-moving device, where the first identifier is an identifier that is obtained by the goods-container-moving device after receiving the first control instruction and that corresponds to the target storage space storing the target storage-goods container; and updating a state of the storage spaces corresponding to the first identifier to a state of a free storage space according to the first notification information.

In some embodiments, the method further includes: receiving second notification information that includes a second identifier and that is sent by the goods-container-moving device, where the second identifier is an identifier that is obtained by the goods-container-moving device after receiving the second control instruction and that corresponds to the free storage space; and updating a state of the free storage space corresponding to the second identifier to a state of a used storage space according to the second notification information.

In some embodiments, the method further includes: receiving first query information sent by the goods-container-moving device after picking of any target goods is completed, and feeding back current state information of the target storage space corresponding to the target storage-goods container that completes the picking of the target goods to the goods-container-moving device based on the first query information; or receiving second query information sent by the goods-container-moving device after picking of any target goods is completed, and feeding back information about the free storage space on the shelving unit to the goods-container-moving device based on the second query information.

In some embodiments, the method further includes: sending a third control instruction to the goods-container-moving device after all the target goods in the order task are picked, where the third control instruction is configured to instruct the goods-container-moving device to move all collection-goods containers containing the target goods to a second picking area.

In some embodiments, the method further includes: receiving third notification information that includes a third identifier and that is sent by the goods-container-moving device, where the third identifier is an identifier that is obtained by the goods-container-moving device after receiving the third control instruction and that corresponds to the storage space temporarily storing the collection-goods containers containing the target goods; and updating a state of the storage space corresponding to the third identifier to a state of a free storage space according to the third notification information.

According to another aspect, the present disclosure provides a goods collection device, applied to a goods-container-moving device and including: a movement module, configured to move, when receiving a first control instruction sent by a control terminal based on an order task, a target storage-goods container storing target goods in the order task to a first picking area, where the first picking area is an area in which the target goods are picked from the target storage-goods container to a collection-goods containers; and a temporary storage module, configured to temporarily store, when receiving a second control instruction sent by the control terminal based on a free storage space in which no storage-goods container or collection-goods container is currently placed on a shelving unit, the collection-goods containers that completes the picking of the target goods to the free storage space, where the free storage spaces is a storage space configured to place the storage-goods container or the collection-goods container on the shelving unit, and the storage-goods container is configured to store goods.

According to another aspect, the present disclosure provides a goods collection device, applied to a control terminal and including: an obtaining module, configured to obtain an order task including target goods; and a control module, configured to send a first control instruction to a goods-container-moving device based on the order task, where the first control instruction is configured to instruct the goods-container-moving device to move a target storage-goods container storing the target goods to a first picking area, and the first picking area is an area in which the target goods are picked from the target storage-goods container to a collection-goods container, where the obtaining module is further configured to obtain a free storage space in which no storage-goods container or collection-goods container is currently placed on a shelving unit; the control module is further configured to send a second control instruction to the goods-container-moving device, where the second control instruction is configured to instruct the goods-container-moving device to temporarily store the collection-goods container that completes the picking of the target goods to the free storage space; and the free storage space is a storage space configured to place the storage-goods container or the collection-goods container on the shelving unit, and the storage-goods container is configured to store goods.

According to another aspect, the present disclosure provides a goods-container-moving device, including: at least one processor; and a memory communicatively connected to the at least one processor, where the memory stores instructions executable by the at least one processor, and the instructions, when executed by the at least one processor, causes the goods-container-moving device to perform the foregoing method.

According to another aspect, the present disclosure provides a control terminal, including: at least one processor; and a memory communicatively connected to the at least one processor, where the memory stores instructions executable by the at least one processor, and the instructions, when executed by the at least one processor, causes the control terminal to perform the foregoing method.

According to another aspect, the present disclosure provides a computer-readable storage medium, storing computer executable instructions, where the computer executable instructions, when executed by a processor, are configured to implement the foregoing goods collection method.

The present disclosure provides a warehousing system, a goods collection method and device, a goods-container-moving device, a control terminal, and a storage medium. In the warehousing system, a shelving unit is provided with a plurality of storage spaces configured to place a storage-goods container or a collection-goods container. When not all the storage spaces on the shelving unit store storage-goods container, or a storage-goods container is removed from a storage space by the goods-container-moving device (for example, for goods picking), there may be a free storage space. In this case, in the collection process, under the control of the control terminal, the goods-container-moving device temporarily stores collection-goods containers that complete picking of goods in the free storage spaces of the shelving unit. That is, the storage space on the shelving unit can be used to both place the storage-goods container and temporarily store the collection-goods container. Therefore, in the collection process, it is not necessary to set a specific temporary storage area or temporary shelving unit to temporarily store goods, which effectively improves the space utilization of the warehousing system. In addition, there is no limitation on the size of the temporary storage area or the temporary shelving unit. Therefore, collection operations of a larger quantity of order tasks can be performed, thereby improving the efficiency of warehouse collection operations.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure.

FIG. 4 is a flow chart of a goods collection method according to an embodiment of the present disclosure.

FIG. 5 is another flow chart of a goods collection method according to an embodiment of the present disclosure.

DESCRIPTIONS OF REFERENCE NUMERALS

Figure 1:
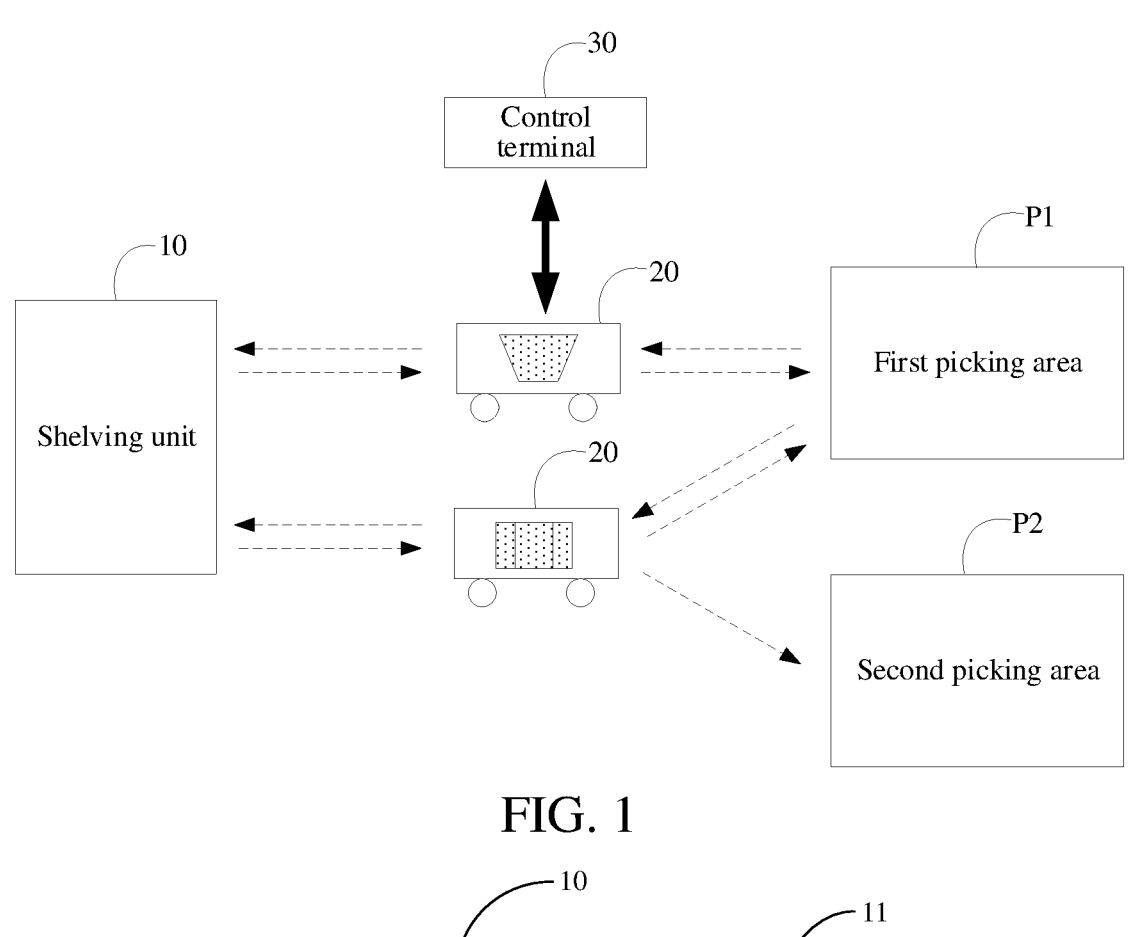
FIG. 1 is a schematic diagram of a warehousing system according to an embodiment of the present disclosure.

10: shelving unit; 11: storage space (also referred to as target storage space, free storage space, or used storage space); 20: goods-container-moving device; 21: movable structure; 22: goods container storage area; 23: goods container grasping structure; 24: camera; 30: control terminal; 41: storage-goods container (also referred to as target storage-goods container); 42: collection-goods container; P1: first picking area; P2: second picking area; 120: movement module; 140: temporary storage module; 220: obtaining module; and 240: control module.

The foregoing accompanying drawings illustrate specific embodiments of the present disclosure, and more detailed description is provided below. The accompanying drawings and text descriptions are not intended to limit the scope of the idea of the present disclosure in any manner, but are intended to describe the concept of the present disclosure to a person skilled in the art with reference to particular embodiments.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

The terms used in the embodiments of the present disclosure are merely for the purpose of illustrating specific embodiments, and are not intended to limit the present invention. The terms "a", "said" and "the" of singular forms used in the embodiments of the present disclosure are also intended to include plural forms, unless otherwise specified in the context clearly.

The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Depending on the context, for example, terms "if" or "as if" used herein may be explained as "while . . . " or "when . . . " or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detection (the stated condition or event)".

It should be further noted that the terms "include", "contain", and any variants thereof are intended to cover a non-exclusive inclusion. Therefore, a merchandise or a system that includes a series of elements not only includes such elements, but also includes other elements not specified expressly, or but also includes inherent elements of the merchandise or the system. Unless otherwise specified, an element limited by "include a/an . . . " does not exclude other same elements existing in the merchandise or the system that includes the element.

First, professional terms involved in the present disclosure are explained.

1. Collection of goods: When receiving a plurality of order tasks, a warehousing system may first count a total quantity of goods of the same type in the plurality of order tasks, and then directly select the sufficient quantity of goods of the same type corresponding to the plurality of orders at a time, to reduce the quantity of times of goods selection.

For example, it is assumed that the warehousing system currently receives three order tasks, and the corresponding goods types and quantities are as follows:

|  | Goods A | Goods B | Goods C | Goods D |
|---|---|---|---|---|
| Order 1 | 1 | 3 | 2 | 0 |
| Order 2 | 2 | 4 | 1 | 6 |
| Order 3 | 2 | 4 | 2 | 3 |

If the corresponding goods are respectively selected according to different order tasks, the warehousing system needs to perform selection for three times to complete the order 1, and perform selection for four times to complete each of the order 2 or the order 3, that is, the warehousing system needs to perform selection for a total of eleven times to complete the foregoing three order tasks.

If the warehousing system adopts multi-order-task joint collection processing, it is only necessary to perform collection selection on the goods A, the goods B, the goods C, and the goods D for one time respectively, where the goods quantities corresponding to the picked four types of goods are respectively 5, 11, 5, and 9. Only a total of four times of selection are required, thereby improving the goods picking efficiency through collection of goods.

2. Secondary sorting: After the collection processing, the warehousing system sorts, according to the requirements of different order tasks, the corresponding types and quantities of goods from the goods selected from the collection, to perform subsequent packaging and transportation.

For example, referring to the foregoing example, after five goods A, eleven goods B, five goods C, and nine goods D are obtained through the collection processing, the corresponding goods of the corresponding quantities of the order 1, the order 2, and the order 3 are selected respectively, and all goods of the same order task are packaged.

3. Storage-goods container: It is a goods container configured to store goods in the warehousing system. A large quantity of goods of the same type are stored in a single storage-goods container, so that a corresponding quantity of goods of the same type can be picked from the storage-goods container.

For example, a storage-goods container stores 100 goods A, another storage-goods container stores 150 goods B, or the like.

4. Collection-goods container: It is a goods container configured to temporarily store picked goods in the warehousing system, which may be understood as a turnover goods container. A single collection-goods container temporarily stores goods of a single type.

For example, referring to the foregoing example, five goods A are temporarily stored in a collection-goods container, eleven goods B are temporarily stored in another collection-goods container, five goods C are temporarily stored in another collection-goods container, and nine goods D are temporarily stored in another collection-goods container.

In the related picking strategy, when a collection-goods container is used for collection, it is necessary to set a specific temporary storage area or temporary shelving unit to temporarily store the collection-goods container. As a result, the warehouse resources are occupied. In addition, a larger quantity of order tasks indicates a larger quantity of goods that need to be temporarily stored in the collection process and more space to be occupied for the temporary storage. However, due to the limited size of the specific temporary storage area or temporary shelving unit, the quantity of stored collection-goods containers is limited, and thus the quantity of simultaneous order tasks is limited, which finally leads to low efficiency of warehouse collection operations.

The warehousing system provided in the present disclosure aims to resolve the foregoing technical problems in the related art. The present disclosure provides a warehousing system. Collection-goods containers that complete picking of goods are temporarily stored in free storage spaces of a shelving unit. That is, the storage spaces on the shelving unit can be used to both place storage-goods container and temporarily store collection-goods containers. Therefore, in the collection process, it is not necessary to set a specific area or shelving unit to temporarily store goods. In addition, there is no limitation on the size of the area or the shelving unit. Therefore, collection operations of a larger quantity of order tasks can be performed, thereby improving the efficiency of warehouse collection operations.

The following describes the technical solutions of the present disclosure and how to resolve the foregoing technical problems according to the technical solutions of the present disclosure in detail by using specific embodiments. The following several specific embodiments may be combined with each other, and a same or similar concept or process may not be described repeatedly in some embodiments. The following describes the embodiments of the present disclosure with reference to accompanying drawings.

FIG. 1 is a schematic diagram of a warehousing system according to an embodiment of the present disclosure. As shown in FIG. 1, the warehousing system includes: a shelving unit 10, a goods-container-moving device 20, and a control terminal 30.

The shelving unit 10 is a shelving unit used for storing goods in the warehouse. The goods-container-moving device 20 may be specifically a transport robot, etc. The control terminal 30 may be specifically a computer device or server, etc.

In addition, a first picking area P1 in FIG. 1 is an area in which the collection processing is performed, and a second picking area P2 is an area in which the secondary sorting of goods is performed.

Figure 2:
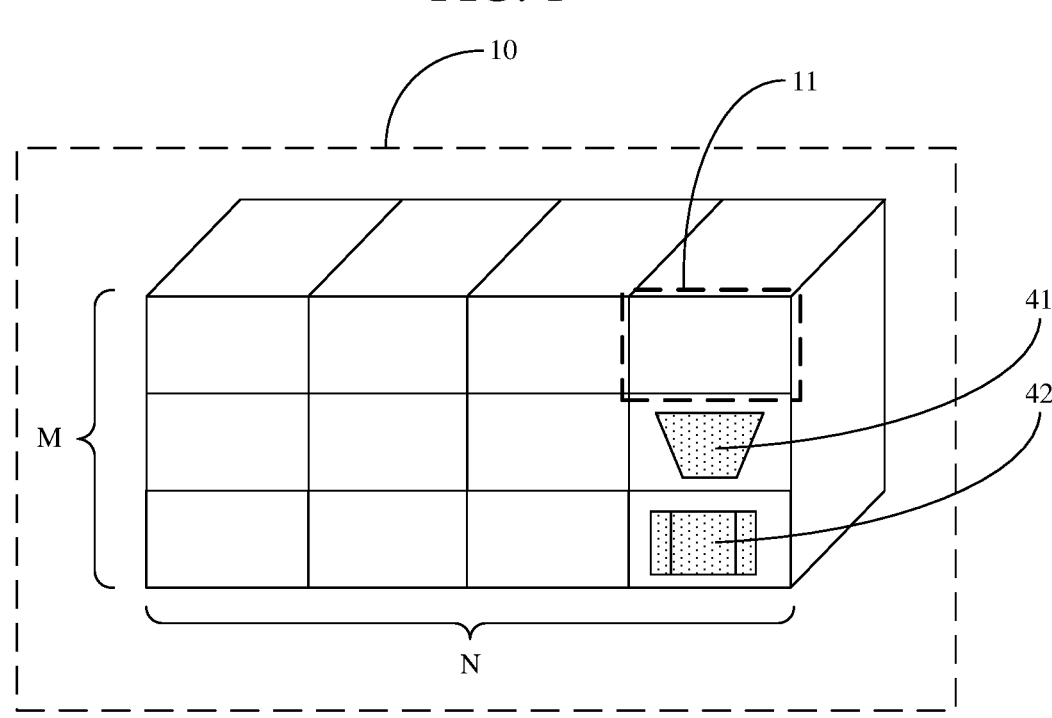
FIG. 2 is a schematic diagram of a shelving unit according to an embodiment of the present disclosure.

FIG. 2 is a schematic diagram of a shelving unit 10 according to an embodiment of the present disclosure. As shown in FIG. 2, a single shelving unit 10 is provided with a plurality of storage spaces 11 configured to place a storage-goods container 41 or a collection-goods container 42. Specifically, N storage spaces 11 may be set horizontally and M storage spaces 11 may be set vertically, that is, a total of M×N storage spaces 11 may be set. The storage-goods container 41 are configured to store goods. In the warehousing system of the present disclosure, there may be a plurality of shelving units 10, that is, the warehousing system includes a plurality of shelving units 10. The arrangement manner and quantities of storage spaces 11 on the shelving units 10 may be the same or different. The quantity of the shelving units 10 and the quantity of storage spaces 11 on a single shelving unit 10 may be determined according to the quantity of storage-goods container 41 storing goods. For example, a total quantity of storage spaces 11 on all shelving units 10 may be equal to or greater than the quantity of storage-goods container 41.

Optionally, a corresponding first goods container label is set on each storage-goods container 41. The first goods container label may correspond to a type of goods stored in the storage-goods container 41, so that the type of goods stored in the storage-goods container can be determined based on the first goods container label set on the storage-goods container 41. The first goods container label may be, for example, a barcode or two-dimensional code, or may be one or a combination of at least two of text, letters, numbers, and symbols.

Referring to FIG. 1, the goods-container-moving device 20 may communicate wirelessly with the control terminal 30, and the goods-container-moving device 20 is configured to move a goods container according to a control instructions sent by the control terminal 30.

Specifically, the control terminal 30 is configured to obtain an order task including target goods, and send a first control instruction to the goods-container-moving device 20 based on the order task. The first control instruction includes type information of goods that need to be picked and goods location information. The goods location information is specifically information about the location of the goods on the shelving unit 10. Therefore, the goods-container-moving device 20 can move to the corresponding location according to the goods location information to perform the subsequent goods container moving operation.

The goods-container-moving device 20 is configured to move target storage-goods container 41 storing target goods to a first picking area P1 according to the first control instruction sent by the control terminal 30. The first picking area P1 is an area in which the target goods are picked from the target storage-goods container 41 to a collection-goods container 42, that is, an area in which the collection processing is performed. The manner of picking goods in the first picking area P1 may be manual picking and/or automatic machine picking, etc.

Figure 3:
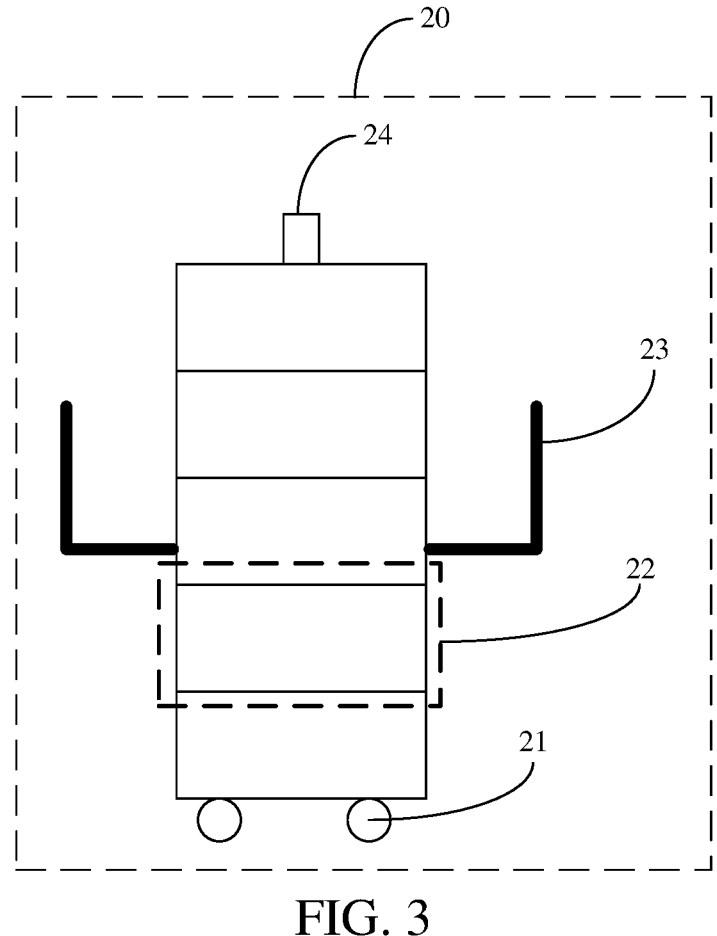
FIG. 3 is a schematic diagram of a goods-container-moving device according to an embodiment of the present disclosure.

FIG. 3 is a schematic diagram of a goods-container-moving device 20 according to an embodiment of the present disclosure. As shown in FIG. 3, the goods-container-moving device 20 includes a movable structure 21 (for example, a roller or a track) and a goods container storage area 22. The movable structure 21 may be configured to move, and the goods container storage area 22 may be configured to store goods containers. There may be one or more goods container storage areas 22. When the goods-container-moving device 20 is provided with a plurality of goods container storage areas 22, the goods-container-moving device 20 can move a plurality of goods containers simultaneously.

Optionally, referring to FIG. 3, the goods-container-moving device 20 is further provided with a goods container grasping structure 23. The goods container grasping structure 23 is configured to grasp and place a goods container in the goods container storage area 22.

Optionally, referring to FIG. 3, the goods-container-moving device 20 is further provided with a camera 24, the camera 24 is configured to capture a goods container label and identify the goods container label, so as to determine a type of goods stored in the goods container.

It may be understood that the goods-container-moving device 20 is further provided with a processor, a communication module, and other structures (not shown in the figure), so that the goods-container-moving device 20 can communicate with the control terminal 30, etc.

Optionally, a corresponding second goods container label is set on each collection-goods container 42. The second goods container label may correspond to a type of goods stored in the collection-goods container 42, so that the type of goods stored in the collection-goods container can be determined based on the second goods container label set on the collection-goods container 42. The second goods container label may be, for example, a barcode or two-dimensional code, or may be one or a combination of at least two of text, letters, numbers, and symbols.

In addition, the control terminal 30 further stores current state information of each storage space 11. A current state includes at least two types: free and used. After the picking of the target goods is completed, the control terminal 30 is further configured to obtain a free storage space 11 in which no storage-goods container or collection-goods container is currently placed on the shelving unit 10, and send a second control instruction to the goods-container-moving device 20. The second control instruction includes location information of the free storage space 11 on the shelving unit 10.

The goods-container-moving device 20 is further configured to temporarily store the collection-goods container 42 that completes the picking of the target goods to the free storage space 11 according to the second control instruction. The collection-goods container 42 that completes the picking of the target goods means that the collection-goods container 42 have contained all the target goods that the collection-goods container 42 should contain. In other words, all the target goods that should be picked from the storage-goods container 41 to the collection-goods container 42 have already been picked to the collection-goods container 42.

Optionally, when the goods-container-moving device 20 moves the collection-goods container 42 that completes the picking of the target goods, the collection-goods container 42 may be placed in the goods container storage area 22 by manual carrying. In addition, the goods-container-moving device 20 may automatically place the collection-goods containers 42 in the goods container storage area 22 through the goods container grasping structure 23. For example, the goods container grasping structure 23 directly takes out the collection-goods containers 42 from the conveyor line and puts the boxes in the goods container storage area 22.

Optionally, when the collection-goods container 42 that completes the picking of the target goods are temporarily stored to the free storage space 11, the collection-goods container 42 may be temporarily stored to any free storage space 11 or the free storage space 11 that meet specific conditions. Therefore, the temporary storage location of the collection-goods containers 42 are more flexible.

The present disclosure provides a warehousing system. In the warehousing system, a shelving unit 10 is provided with storage spaces 11 for placing the storage-goods container. When not all the storage spaces 11 on the shelving unit 10 store storage-goods container 41, or a storage-goods container 41 is removed from a storage space 11 by the goods-container-moving device 20 (for example, for goods picking), there may be free storage spaces 11. In this case, in the collection process, under the control of the control terminal 30, the goods-container-moving device 20 temporarily stores collection-goods container 42 that completes picking of goods in the free storage spaces 11 of the shelving unit 10. That is, the storage space 11 on the shelving unit 10 can be configured to both place the storage-goods container 41 and temporarily store the collection-goods container 42. Therefore, in the collection process, it is not necessary to set a specific temporary storage area or temporary shelving unit to temporarily store goods, which effectively improves the space utilization of the warehousing system. In addition, there is no limitation on the size of the temporary storage area or the temporary shelving unit. Therefore, collection operations of a larger quantity of order tasks can be performed, thereby improving the efficiency of warehouse collection operations.

In some embodiments, each of the storage spaces 11 on the shelving unit 10 is correspondingly provided with an identifier (not shown in the figure). The identifier may be set at the corresponding location of each storage space 11 through painting, drawing, pasting, welding, or detachable connection. The identifier may be, for example, a barcode or two-dimensional code, or may be one or a combination of at least two of text, letters, numbers, and symbols.

The goods-container-moving device 20 is further configured to obtain, through the camera 24 after receiving the first control instruction, a first identifier of target storage space 11 storing the target storage-goods container 41, and send first notification information including the first identifier to the control terminal 30. The control terminal 30 is further configured to update the storage space 11 corresponding to the first identifier to free storage space 11 according to the first notification information, that is, update a state of the storage space 11 corresponding to the first identifier to a state of free.

Specifically, after the goods-container-moving device 20 moves the target storage-goods container 41, no goods container is placed in the target storage space 11 corresponding to the target storage-goods container 41, that is, the target storage space 11 become a free storage space 11. In this case, the free storage space 11 may be configured to temporarily store the collection-goods containers 42. Therefore, through the communication between the goods-container-moving device 20 and the control terminal 30, the control terminal 30 can update the state information of the storage space 11 on the shelving unit 10, to facilitate the subsequent allocation of the storage spaces 11, so that the warehouse management is more scientific and appropriate.

It should be noted that this embodiment does not strictly limit the order in which the goods-container-moving device 20 obtains the first identifier, sends the first notification message, and moves the target storage-goods container.

For example, after receiving the first control instruction, the goods-container-moving device 20 may first obtain the first identifier and send the first notification message, and then move the target storage-goods container; or obtain the first identifier, and then perform the operations of sending the first notification message and moving the target storage-goods container simultaneously; or obtain the first identifier, move the target storage-goods container, and finally send the first notification message; or move the target storage-goods container first, and then obtain the first identifier and send the first notification message, or the like.

In some embodiments, the goods-container-moving device 20 is further configured to obtain, through the camera 24 after receiving the second control instruction, a second identifier of the free storage space 11, and send second notification information including the second identifier to the control terminal 30. The control terminal 30 is further configured to update a state of the storage space 11 corresponding to the second identifier to a state of being used (that is, the storage space 11 is a used storage space 11) according to the second notification information.

Specifically, after the goods-container-moving device 20 temporarily stores the collection-goods containers 42 to the free storage space 11 according to the second control instruction, the current state of the free storage space 11 become a state of being used. In this case, the storage space 11 cannot store other goods containers. Therefore, through the communication between the goods-container-moving device 20 and the control terminal 30, the control terminal 30 can update the state information of the storage space 11 on the shelving unit 10, to facilitate the subsequent allocation of the storage space 11, so that the warehouse management is more scientific and appropriate.

It should be noted that this embodiment does not strictly limit the order in which the goods-container-moving device 20 obtains the second identifier, sends the second notification message, and temporarily stores the collection-goods containers.

For example, after receiving the second control instruction, the goods-container-moving device 20 may first obtain the second identifier and send the second notification message, and then temporarily store the collection-goods container; or obtain the second identifier, and then perform the operations of sending the second notification message and temporarily storing the collection-goods container simultaneously; or obtain the second identifier, temporarily store the collection-goods container, and finally send the second notification message; or temporarily store the collection-goods container first, and then obtain the second identifier and send the second notification message, or the like.

In some embodiments, the goods-container-moving device 20 is further configured to: send first query information to the control terminal 30 after picking of any target goods is completed. The first query information is configured to query a current state of a target storage space 11 (that is, an original storage space corresponding to a target storage-goods container) corresponding to a target storage-goods container that completes the picking of the target goods; receive current state information of the target storage space 11 fed back by the control terminal 30 based on the first query information; and move and place the target storage-goods container 41 corresponding to the picked target goods in the target storage space 11 if the current status of the target storage space 11 is free. The target storage-goods container 41 corresponding to the picked target goods is the storage-goods container 41 in which the picked target goods is originally stored. The picked target goods are the target goods that was originally stored in the target storage-goods container 41, and currently have been picked from the target storage-goods container 41 to the collection-goods container 42 in the first picking area P1.

Optionally, after moving and placing the target storage-goods container 41 in the target storage space 11, the goods-container-moving device 20 sends corresponding notification information to the control terminal 30 to instruct the control terminal 30 to update the state of the target storage space 11.

Optionally, if the current status of the target storage space 11 corresponding to the target storage-goods container that completes the picking of the target goods is used, it means that the target storage space 11 currently stores another goods container. In this case, the goods-container-moving device 20 may temporarily store the target storage-goods container 41 in the goods container storage area 22 of the goods-container-moving device 20. Until the target storage space 11 changes to a free storage space 11, the target storage-goods container 41 is moved and placed in the target storage space 11.

Optionally, if the current state of the target storage space 11 corresponding to the target storage-goods container that completes the picking of the target goods is used, it means that the target storage space 11 currently stores another goods container. In this case, the goods-container-moving device 20 may continue to obtain another free storage space 11 except the target storage space 11 from the control terminal 30, and move and place the target storage-goods container 41 in the free storage space 11.

Therefore, the target storage-goods container 41 that completes the picking is preferentially placed back to the corresponding target storage space 11, which can ensure that the goods storage location is strictly fixed, to facilitate the subsequent replenishment processing.

In some embodiments, the goods-container-moving device 20 is further configured to: send second query information to the control terminal 30 after picking of any target goods is completed, where the second query information is configured to query a free storage space 11 on the shelving unit 10; and receive information about the free storage space 11 on the shelving unit 10 fed back by the control terminal 30 based on the second query information; and move and place, in a case that there is a free storage space 11 on the shelving unit 10, the target storage-goods container 41 corresponding to the picked target goods in the free storage space 11.

Optionally, the goods-container-moving device 20 may first determine a free storage space 11 that meets a preset condition, and then move and place the target storage-goods container 41 in the free storage space 11 that meets the preset condition. The preset condition may be, for example, that a distance for the goods-container-moving device 20 to move to the free storage space 11 is the shortest, or a distance between the free storage space 11 and the first picking area P1 is the shortest, thereby improving the collection efficiency.

Optionally, if there are no free storage space 11 on all the shelving units 10, that is, all the storage spaces 11 on all the shelving units 10 are occupied, the goods-container-moving device 20 may temporarily store the target storage-goods container 41 in the goods container storage area 22 of the goods-container-moving device 20. Until there is a free storage space 11 on the shelving unit 10, the target storage-goods container 41 is moved and placed in the free storage space 11.

Therefore, the target storage-goods container 41 that completes the picking is preferentially placed back to any free storage space 11, so that the goods storage can be more flexible, improving the collection efficiency.

In some embodiments, the control terminal 30 is further configured to send a third control instruction to the goods-container-moving device 20 after all the target goods in the order task are picked, and the goods-container-moving device 20 is further configured to move all the collection-goods containers 42 containing the target goods to a second picking area P2 according to the third control instruction.

Specifically, the second picking area P2 is the area in which the secondary sorting of goods is performed, such as a seeding wall or a conveyor line. The manner of secondary sorting of goods in the second picking area P2 may be manual sorting and/or automatic machine sorting. After all the target goods are picked, the control terminal 30 controls the goods-container-moving device 20 to move all the collection-goods containers 42 containing the target goods to the second picking area P2, to facilitate the subsequent processing such as secondary sorting or packaging.

In some embodiments, the goods-container-moving device 20 is further configured to obtain, after receiving the third control instruction, a third identifier of the storage space 11 temporarily storing the collection-goods containers 42 containing the target goods, and send third notification information including the third identifier to the control terminal 30. The control terminal 30 is further configured to update the storage space 11 corresponding to the third identifier to a free storage space 11 according to the third notification information, for example, update the state of the storage space 11 from a used state to a free state.

Specifically, after the goods-container-moving device 20 moves the target storage-goods container 41, no goods container is placed in the target storage space 11 corresponding to the target storage-goods container 41, that is, the current state of the target storage space 11 become free. In this case, the free storage space 11 may be configured to temporarily store the collection-goods container 42. Therefore, through the communication between the goods-container-moving device 20 and the control terminal 30, the control terminal 30 can update the state information of the storage space 11 on the shelving unit 10, to facilitate the subsequent allocation of the storage space 11, so that the warehouse management is more scientific and appropriate.

It should be noted that this embodiment does not strictly limit the order in which the goods-container-moving device 20 obtains the third identifier, sends the third notification message, and moves the collection-goods containers.

For example, after receiving the third control instruction, the goods-container-moving device 20 may first obtain the third identifier and send the third notification message, and then move the collection-goods container; or obtain the third identifier, and then perform the operations of sending the third notification message and moving the collection-goods container simultaneously; or obtain the third identifier, move the collection-goods container, and finally send the third notification message; or move the collection-goods container first, and then obtain the third identifier and send the third notification message, or the like.

In some embodiments, when the goods-container-moving device 20 determines the corresponding identity information of the goods containers and the storage spaces, goods container labels set on the goods containers and identifiers correspondingly set on the storage spaces may be alternatively electronic labels. In this case, the camera 24 on the goods-container-moving device 20 may be correspondingly adjusted to an electronic label identification device. The electronic label identification device may identify electronic labels through, for example, radio frequency identification (RFID), to obtain identity information of goods containers and storage spaces.

In some embodiments, when the goods-container-moving device 20 sends notification information to the control terminal 30, an image of the storage space 11 may be captured through the camera 24, and the captured image of the storage space is then sent to the control terminal 30.

The control terminal 30 may perform image processing on the image of the storage space (for example, image recognition, separation, and classification), to determine whether the storage space in the storage space image currently stores a goods container, and then update the status of the storage space according to an image processing result.

It may be understood that in a case that the control terminal 30 can identify the status of the storage space based on the storage space image, in the solution of this embodiment, the goods-container-moving device 20 can skip performing the step of obtaining the identifier of the storage space, that is, the notification information sent by the goods-container-moving device 20 to the control terminal 30 does not include the identifier corresponding to the storage space.

FIG. 4 is a schematic diagram of a goods collection method according to an embodiment of the present disclosure. The goods collection method is applied to the foregoing warehousing system, and may be specifically applied to the processor in the goods-container-moving device 20. In other words, the goods collection method of the present embodiments is executed by the goods-container-moving device. As shown in FIG. 4, the goods collection method includes the following operations:

S120: A target storage-goods container 41 storing target goods in an order task is moved to a first picking area P1 when a first control instruction sent by a control terminal 30 based on the order task is received. The first picking area P1 is an area in which the target goods are picked from the target storage-goods container 41 to a collection-goods container 42.

S140: When a second control instruction is received, the collection-goods container 42 that completes the picking of the target goods is temporarily stored to a free storage space 11. The second control instruction is sent by the control terminal 30 based on the free storage space 11 in which no storage-goods container or collection-goods container is currently placed on a shelving unit 10.

The free storage space 11 is storage space 11 configured to place the storage-goods container 41 on the shelving unit 10, and the storage-goods container 41 are configured to store goods.

Therefore, in the collection process, under the control of the control terminal 30, the goods-container-moving device 20 temporarily stores the collection-goods container 42 that completes picking of goods in the free storage space 11 of the shelving unit 10. That is, the storage spaces 11 on the shelving unit 10 can be configured to both place the storage-goods container 41 and temporarily store the collection-goods container 42. Therefore, in the collection process, it is not necessary to set a specific area or shelving unit 10 to temporarily store goods. In addition, there is no limitation on the size of the area or the shelving unit 10. Therefore, collection operations of a larger quantity of order tasks can be performed, thereby improving the efficiency of warehouse collection operations.

In some embodiments, the goods collection method further includes: obtaining, after receiving the first control instruction, a first identifier of a target storage space 11 storing the target storage-goods container 41, and sending first notification information including the first identifier to the control terminal 30, where the first notification information is configured to instruct the control terminal 30 to update a state of the storage space 11 corresponding to the first identifier to a state of a free storage space 11.

Therefore, through the communication with the control terminal 30, the control terminal 30 can update the state information of the storage spaces 11 on the shelving unit 10, to facilitate the subsequent allocation of the storage spaces 11, so that the warehouse management is more scientific and appropriate.

In some embodiments, the goods collection method further includes: obtaining, after receiving the second control instruction, a second identifier of the free storage space 11, and send second notification information including the second identifier to the control terminal 30, where the second notification information is configured to instruct the control terminal 30 to update a state of the storage space 11 corresponding to the second identifier to a state of a used storage spaces 11.

Therefore, through the communication with the control terminal 30, the control terminal 30 can update the state information of the storage space 11 on the shelving unit 10, to facilitate the subsequent allocation of the storage spaces 11, so that the warehouse management is more scientific and appropriate.

In some embodiments, the goods collection method further includes: sending first query information to the control terminal 30 after picking of any target goods is completed, where the first query information is configured to query a current state of the target storage space 11 corresponding to the target storage-goods container that completes the picking of the target goods; receiving current state information of the target storage space 11 fed back by the control terminal 30 based on the first query information; and moving and placing the target storage-goods container 41 corresponding to the picked target goods in the target storage space 11 in response to the target storage space 11 being currently a free storage space 11.

Therefore, the target storage-goods container 41 that completes the picking is preferentially placed back to the corresponding target storage space 11, which can ensure that the goods storage location is strictly fixed, to facilitate the subsequent replenishment processing.

In some embodiments, the goods collection method further includes: sending second query information to the control terminal 30 after picking of any target goods is completed, where the second query information is configured to query a free storage space 11 on the shelving unit 10; receiving information about the free storage space 11 on the shelving unit 10 fed back by the control terminal 30 based on the second query information; and moving and placing a target storage-goods container 41 corresponding to the picked target goods in the free storage space 11 in response to there being a free storage space 11 on the shelving unit 10.

Therefore, the target storage-goods container 41 that completes the picking is preferentially placed back to any free storage space 11, so that the goods storage can be more flexible, improving the collection efficiency.

In some embodiments, the goods collection method further includes: after the information about the free storage space on the shelving unit fed back by the control terminal based on the second query information is received, in response to there being at least two free storage spaces on the shelving unit, determining, based on the at least two free storage spaces on the shelving unit, a free storage space that meets a preset condition, and moving and placing the target storage-goods container in the free storage space that meets the preset condition, where the preset condition includes that a distance for a goods-container-moving device to move to the free storage space is the shortest, or a distance between the free storage space and the first picking area is the shortest.

In some embodiments, the goods collection method further includes: moving, when receiving a third control instruction sent by the control terminal 30 after all the target goods in the order task are picked, all the collection-goods containers 42 containing the target goods to a second picking area P2, to facilitate the subsequent processing such as sorting and packaging.

In some embodiments, the goods collection method further includes: obtaining, after receiving the third control instruction, a third identifier of storage space 11 temporarily storing the collection-goods container 42 containing the target goods, and sending third notification information including the third identifier to the control terminal 30. The third notification information is configured to instruct the control terminal 30 to update a state of the storage spaces 11 corresponding to the third identifier to a state of free storage space 11.

Therefore, through the communication with the control terminal 30, the control terminal 30 can update the status information of the storage spaces 11 on the shelving unit 10, to facilitate the subsequent allocation of the storage spaces 11, so that the warehouse management is more scientific and appropriate.

Figure 5:
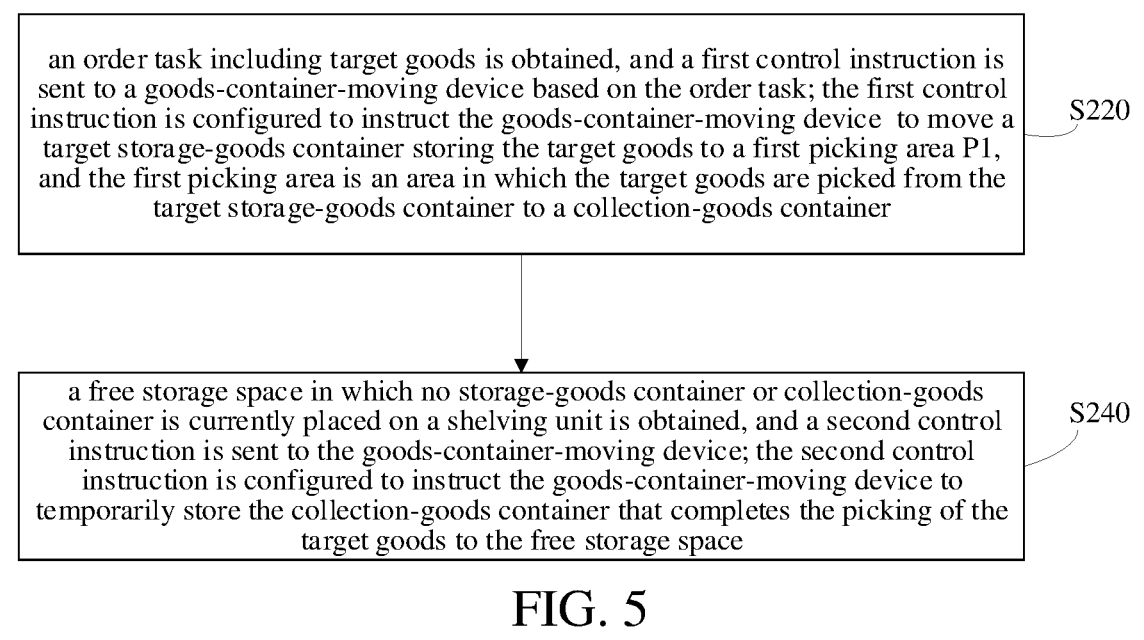

FIG. 5 is a schematic diagram of a goods collection method according to an embodiment of the present disclosure. The goods collection method is applied to the foregoing warehousing system, and may be specifically applied to the control terminal 30, that is, executed by the control terminal 30. As shown in FIG. 5, the goods collection method includes the following operations:

S220: an order task including target goods is obtained, and a first control instruction is sent to a goods-container-moving device 20 based on the order task. The first control instruction is configured to instruct the goods-container-moving device 20 to move a target storage-goods container 41 storing the target goods to a first picking area P1, and the first picking area P1 is an area in which the target goods are picked from the target storage-goods container 41 to a collection-goods container 42.

S240: a free storage space 11 in which no storage-goods container or collection-goods container is currently placed on a shelving unit 10 is obtained, and a second control instruction is sent to the goods-container-moving device 20. The second control instruction is configured to instruct the goods-container-moving device 20 to temporarily store the collection-goods container 42 that completes the picking of the target goods to the free storage space 11.

The free storage space 11 is a storage space 11 configured to place the storage-goods container 41 or the collection-goods container on the shelving unit 10, and the storage-goods container 41 is configured to store goods.

Therefore, in the collection process, the control terminal 30 controls the goods-container-moving device 20 to temporarily store the collection-goods container 42 that completes picking of goods in the free storage space 11 of the shelving unit 10. That is, the storage space 11 on the shelving unit 10 can be used to both place the storage-goods container 41 and temporarily store the collection-goods container 42. Therefore, in the collection process, it is not necessary to set a specific area or shelving unit 10 to temporarily store goods. In addition, there is no limitation on the size of the area or the shelving unit 10. Therefore, collection operations of a larger quantity of order tasks can be performed, thereby improving the efficiency of warehouse collection operations.

In some embodiments, the goods collection method further includes: receiving first notification information that includes a first identifier and that is sent by the goods-container-moving device 20. The first identifier is an identifier that is obtained by the goods-container-moving device 20 after receiving the first control instruction and that corresponds to the target storage space 11 storing the target storage-goods container 41; and updating a state of the storage space 11 corresponding to the first identifier to a state of a free storage space 11 according to the first notification information.

Therefore, through the communication with the goods-container-moving device 20, the control terminal 30 can update the state information of the storage space 11 on the shelving unit 10, to facilitate the subsequent allocation of the storage space 11, so that the warehouse management is more scientific and appropriate.

In some embodiments, the goods collection method further includes: receiving second notification information that includes a second identifier and that is sent by the goods-container-moving device 20. The second identifier is an identifier that is obtained by the goods-container-moving device 20 after receiving the second control instruction and that corresponds to the free storage space 11; and updating a state of the free storage space 11 corresponding to the second identifier to a state of a used storage space 11 according to the second notification information.

Therefore, through the communication with the goods-container-moving device 20, the control terminal 30 can update the status information of the storage spaces 11 on the shelving unit 10, to facilitate the subsequent allocation of the storage spaces 11, so that the warehouse management is more scientific and appropriate.

In some embodiments, the goods collection method further includes: receiving first query information sent by the goods-container-moving device 20 after picking of any target goods is completed, and feeding back current state information of the target storage space 11 corresponding to the target storage-goods container that completes the picking of the target goods to the goods-container-moving device 20 based on the first query information.

Therefore, the target storage-goods container 41 that completes the picking is preferentially placed back to the corresponding target storage space 11, which can ensure that the goods storage location is strictly fixed, to facilitate the subsequent replenishment processing.

In some embodiments, the goods collection method further includes: receiving second query information sent by the goods-container-moving device 20 after picking of any target goods is completed, and feeding back related information about the free storage space 11 on the shelving unit 10 to the goods-container-moving device 20 based on the second query information.

Therefore, the target storage-goods container 41 that completes the picking is preferentially placed back to any free storage space 11, so that the goods storage can be more flexible, improving the collection efficiency.

In some embodiments, the goods collection method further includes: sending a third control instruction to the goods-container-moving device 20 after all the target goods in the order task are picked. The third control instruction is configured to instruct the goods-container-moving device 20 to move all collection-goods containers 42 containing the target goods to a second picking area P2, to facilitate the subsequent processing such as sorting and packaging.

In some embodiments, the goods collection method further includes: receiving third notification information that includes a third identifier and that is sent by the goods-container-moving device 20, where the third identifier is an identifier that is obtained by the goods-container-moving device 20 after receiving the third control instruction and that corresponds to the storage space 11 temporarily storing the collection-goods containers 42 containing the target goods; and updating a state of the storage space 11 corresponding to the third identifier to a state of a free storage space 11 according to the third notification information.

Therefore, through the communication with the goods-container-moving device 20, the control terminal 30 can update the status information of the storage spaces 11 on the shelving unit 10, to facilitate the subsequent allocation of the storage spaces 11, so that the warehouse management is more scientific and appropriate.

Figure 6:
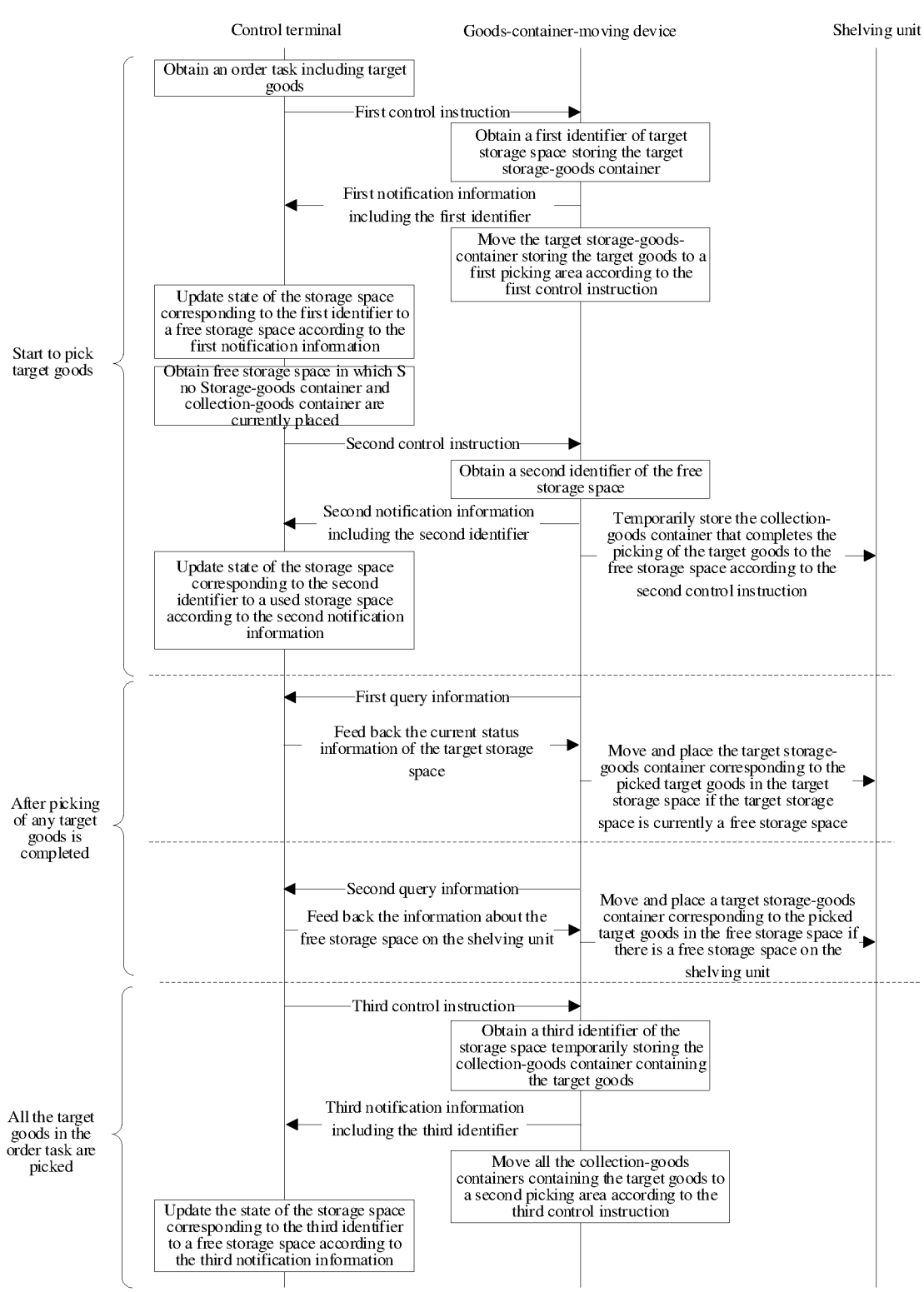
FIG. 6 is a sequence diagram of communication between a goods-container-moving device and a control terminal in a warehousing system according to an embodiment of the present disclosure.

FIG. 6 is a sequence diagram of communication between a goods-container-moving device 20 and a control terminal 30 in a warehousing system. As shown in FIG. 6, the communication between the goods-container-moving device 20 and the control terminal 30 includes the following operations:

(1) At the beginning of picking the target goods, the control terminal 30 obtains an order task including target goods and sends a first control instruction to the goods-container-moving device 20.

(2) The goods-container-moving device 20 obtains a first identifier of a target storage space 11 storing target storage-goods container 41, moves the target storage-goods container 41 storing the target goods to a first picking area P1, and sends first notification information including the first identifier to the control terminal 30.

(3) The control terminal 30 updates a state of the storage spaces 11 corresponding to the first identifier to a state of a free storage space 11 according to the first notification information.

(4) The control terminal 30 obtains a free storage space 11 in which no storage-goods container or collection-goods container is currently placed, and sends a second control instruction to the goods-container-moving device 20.

(5) The goods-container-moving device 20 obtains a second identifier of the free storage space 11, temporarily stores the collection-goods container 42 that completes the picking of the target goods to the free storage space 11, and sends second notification information including the second identifier to the control terminal 30.

(6) The control terminal 30 updates the storage space 11 corresponding to the second identifier to used storage spaces 11 according to the second notification information.

(7) The goods-container-moving device 20 sends first query information to the control terminal 30 after picking of any target goods is completed; after obtaining current state information of the target storage space 11 based on the first query information, the control terminal 30 feeds back the current state information of the target storage space 11 to the goods-container-moving device 20; and the goods-container-moving device 20 moves and places the target storage-goods container 41 corresponding to the picked target goods in the target storage space 11 if the target storage space 11 is currently a free storage space 11; or the goods-container-moving device 20 sends second query information to the control terminal 30 after picking of any target goods is completed; after obtaining information about the free storage space 11 on the shelving unit 10 based on the second query information, the control terminal 30 feeds back the information about the free storage space 11 on the shelving unit 10 to the goods-container-moving device 20; and the goods-container-moving device 20 moves and places the target storage-goods container 41 corresponding to the picked target goods in the free storage space 11 if there is a free storage space 11 on the shelving unit 10.

(8) The control terminal 30 sends a third control instruction to the goods-container-moving device 20 after all the target goods in the order task are picked.

(9) The goods-container-moving device 20 obtains a third identifier of storage space 11 temporarily storing the collection-goods container 42 containing the target goods, moves the collection-goods containers 42 storing the target goods to a second picking area P2, and sends third notification information including the third identifier to the control terminal 30.

(10) The control terminal 30 updates the storage space 11 corresponding to the third identifier to a free storage space 11 according to the third notification information.

Although the operations in the flowcharts of the embodiments are displayed sequentially according to instructions of arrows, these operations are not necessarily performed sequentially according to a sequence instructed by the arrows. Unless explicitly specified in this specification, execution of the steps is not strictly limited in the sequence, and the operations may be performed in other sequences. In addition, at least some operations in the drawings may include a plurality of sub-operations or a plurality of stages. The sub-operations or the stages are not necessarily performed at the same moment, but may be performed at different moments. The sub-operations or the stages are not necessarily performed in sequence, but may be performed in turn or alternately with another step or at least some of sub-operations or stages of the another operation.

In some embodiments, a goods collection device is provided, where the goods collection device is applied to a goods-container-moving device.

Figure 7:
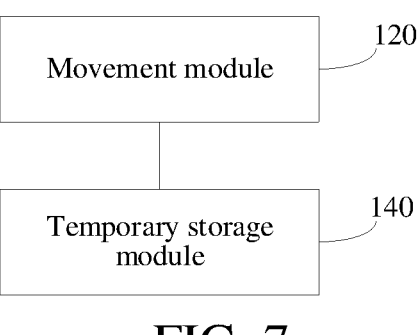
FIG. 7 is a schematic diagram of a goods collection device according to an embodiment of the present disclosure.

FIG. 7 is a schematic diagram of a goods collection device according to an embodiment of the present disclosure. As shown in FIG. 7, the goods collection device includes:

a movement module 120, configured to move, when receiving a first control instruction sent by a control terminal based on an order task, a target storage-goods container storing target goods in the order task to a first picking area. The first picking area is an area in which the target goods are picked from the target storage-goods container to a collection-goods container; and a temporary storage module 140, configured to temporarily store, when receiving a second control instruction sent by the control terminal based on a free storage space in which no storage-goods container or collection-goods container is currently placed on a shelving unit, the collection-goods container that completes the picking of the target goods to the free storage spaces.

The free storage space is a storage space configured to place the storage-goods container or the collection-goods container on the shelving unit, and the storage-goods container is configured to store goods.

For a specific limitation on the goods collection device, reference may be made to the limitation on the foregoing goods collection method applied to the goods-container-moving device. Details are not described herein again. Each module in the foregoing goods collection device may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a goods collection device is provided, where the goods collection device is applied to a control terminal.

Figure 8:
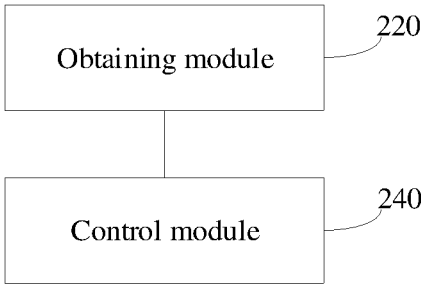
FIG. 8 is another schematic diagram of a goods collection device according to an embodiment of the present disclosure.

FIG. 8 is a schematic diagram of a goods collection device according to an embodiment of the present disclosure. As shown in FIG. 8, the goods collection device includes:

an obtaining module 220, configured to obtain an order task including target goods; and a control module 240, configured to send a first control instruction to a goods-container-moving device based on the order task, where the first control instruction is configured to instruct the goods-container-moving device to move target storage-goods container storing the target goods to a first picking area, and the first picking area is an area in which the target goods are picked from the target storage-goods container to a collection-goods container.

The obtaining module 220 is further configured to obtain a free storage space in which no storage-goods container or collection-goods container is currently placed on a shelving unit.

The control module 240 is further configured to send a second control instruction to the goods-container-moving device. The second control instruction is configured to instruct the goods-container-moving device to temporarily store the collection-goods container that completes the picking of the target goods to the free storage space.

The free storage space is a storage space configured to place the storage-goods container on the shelving unit, and the storage-goods container is configured to store goods.

For a specific limitation on the goods collection device, reference may be made to the limitation on the foregoing goods collection method applied to the control terminal. Details are not described herein again. Each module in the foregoing goods collection device may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a goods-container-moving device is provided, including: at least one processor; and a memory communicatively connected to the at least one processor, where the memory stores instructions executable by the at least one processor, and the instructions, when executed by the at least one processor, causes the goods-container-moving device to perform the goods collection method applied to the goods-container-moving device.

In some embodiments, a control terminal is provided, including: at least one processor; and a memory communicatively connected to the at least one processor, where the memory stores instructions executable by the at least one processor, and the instructions, when executed by the at least one processor, cause the control terminal to perform the goods collection method applied to the control terminal.

In an embodiment, a computer-readable storage medium is provided, storing computer executable instructions, where the computer executable instructions, when executed by a processor, are configured to implement the operations in the method embodiments of the present disclosure.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to the memory, the storage, the database, or another medium used in the embodiments provided in the present disclosure may all include a non-volatile memory and a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

A person skilled in the art can easily figure out other implementation solutions of the present disclosure after considering the specification and practicing this application that is disclosed herein. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as exemplary only, and a true scope and spirit of the present disclosure are indicated by the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A warehousing system, comprising: a shelving unit, a goods-container-moving device, and a control terminal, wherein the shelving unit is provided with a plurality of storage spaces configured to place a storage-goods container and a collection-goods container, wherein the storage-goods container is configured to store goods, wherein the collection-goods container is configured to temporarily store goods picked from the storage-goods container;

the control terminal is configured to send a first control instruction to the goods-container-moving device;

the goods-container-moving device is configured to move a target storage-goods container to a first picking area according to the first control instruction, wherein the target storage-goods container is a storage-goods container storing target goods that is to be picked, the first picking area is an area in which the target goods are picked from the target storage-goods container to a collection-goods container;

the control terminal is further configured to obtain a free storage space on the shelving unit in which no storage-goods container or collection-goods container is currently placed, and send a second control instruction to the goods-container-moving device; and after the picking of the target goods from the target storage-goods container is completed, the goods-container-moving device is further configured to temporarily store the collection-goods container that completes the picking of the target goods to the free storage space according to the second control instruction;

wherein before the control terminal sends a first control instruction to the goods-container-moving device, the control terminal is further configured to obtain an order task comprising the target goods, and the control terminal is configured to send the first control instruction to the goods-container-moving device based on the order task;

wherein the control terminal is further configured to send a third control instruction to the goods-container-moving device after all target goods in the order task are picked; and the goods-container-moving device is further configured to move all the collection-goods containers containing the target goods to a second picking area according to the third control instruction, so as to sort the target goods from the collection-goods containers according to the order task.

2. The warehousing system according to claim 1, wherein each of the plurality of storage spaces on the shelving unit is correspondingly provided with an identifier;

the goods-container-moving device is further configured to obtain, after receiving the first control instruction, a first identifier of a target storage space storing the target storage-goods container, and send first notification information comprising the first identifier to the control terminal; and the control terminal is further configured to update a state of the storage space corresponding to the first identifier to a state of a free storage space according to the first notification information.

3. The warehousing system according to claim 2, wherein the goods-container-moving device is further configured to obtain, after receiving the second control instruction, a second identifier of the free storage space, and send second notification information comprising the second identifier to the control terminal; and the control terminal is further configured to update a state of the free storage space corresponding to the second identifier to a state of a used storage space according to the second notification information.

4. The warehousing system according to claim 2, wherein the goods-container-moving device is further configured to: send first query information to the control terminal after picking of any target goods is completed, wherein the first query information is configured to query a current state of the target storage space corresponding to the target storage-goods container that completes the picking of the target goods; receive current state information of the target storage space fed back by the control terminal based on the first query information; and move and place the target storage-goods container corresponding to the picked target goods in the target storage space in response to the target storage space being currently a free storage space; or the goods-container-moving device is further configured to: send second query information to the control terminal after picking of any target goods is completed, wherein the second query information is configured to query a free storage space on the shelving unit; receive information about the free storage space on the shelving unit fed back by the control terminal based on the second query information; and move and place the target storage-goods container corresponding to the picked target goods in the free storage space in response to there being a free storage space on the shelving unit.

5. The warehousing system according to claim 4, wherein after the information about the free storage space on the shelving unit fed back by the control terminal based on the second query information is received, in response to there being at least two free storage spaces on the shelving unit, the goods-container-moving device is further configured to determine, based on the at least two free storage spaces on the shelving unit, a free storage space that meets a preset condition, and move and place the target storage-goods container in the free storage space that meets the preset condition; and the preset condition comprises that a distance for the goods-container-moving device to move to the free storage space is the shortest, or a distance between the free storage space and the first picking area is the shortest.

6. The warehousing system according to claim 1, wherein the goods-container-moving device is further configured to obtain, after receiving the third control instruction, a third identifier of the storage space temporarily storing the collection-goods containers containing the target goods, and send third notification information comprising the third identifier to the control terminal; and the control terminal is further configured to update a state of the storage space corresponding to the third identifier to a state of a free storage space according to the third notification information.

7. A goods collection method, executed by a goods-container-moving device and comprising:

moving, when receiving a first control instruction sent by a control terminal based on an order task, a target storage-goods container storing target goods in the order task to a first picking area, wherein the first picking area is an area in which the target goods are picked from the target storage-goods container to a collection-goods container; and temporarily storing, when receiving a second control instruction sent by the control terminal based on a free storage space in which no storage-goods container or collection-goods container is currently placed on a shelving unit, the collection-goods container that completes the picking of the target goods to the free storage space;

wherein the free storage space is a storage space configured to place the storage-goods container or the collection-goods container on the shelving unit, and the storage-goods container is configured to store goods;

wherein the method further comprises:

sending first query information to the control terminal after picking of any target goods is completed, wherein the first query information is configured to query a current state of the target storage space corresponding to the target storage-goods container that completes the picking of the target goods; receiving current state information of the target storage space fed back by the control terminal based on the first query information; and moving and placing the target storage-goods container corresponding to the picked target goods in the target storage space in response to the target storage space being currently a free storage space; or sending second query information to the control terminal after picking of any target goods is completed, wherein the second query information is configured to query a free storage space on the shelving unit; receiving information about the free storage space on the shelving unit fed back by the control terminal based on the second query information; and moving and placing the target storage-goods container corresponding to the picked target goods in the free storage space in response to there being a free storage space on the shelving unit; and wherein after the information about the free storage space on the shelving unit fed back by the control terminal based on the second query information is received, in response to there being at least two free storage spaces on the shelving unit, determining, based on the at least two free storage spaces on the shelving unit, a free storage space that meets a preset condition, and moving and placing the target storage-goods container in the free storage space that meets the preset condition, wherein the preset condition comprises that a distance for a goods-container-moving device to move to the free storage space is the shortest, or a distance between the free storage space and the first picking area is the shortest.

8. The goods collection method according to claim 7, further comprising:

obtaining, after receiving the first control instruction, a first identifier of a target storage space storing the target storage-goods container, and sending first notification information comprising the first identifier to the control terminal, wherein the first notification information is configured to instruct the control terminal to update a state of the storage space corresponding to the first identifier to a state of a free storage space.

9. The goods collection method according to claim 7, further comprising:

obtaining, after receiving the second control instruction, a second identifier of the free storage space, and send second notification information comprising the second identifier to the control terminal, wherein the second notification information is configured to instruct the control terminal to update a state of the storage space corresponding to the second identifier to a state of a used storage space.

10. The goods collection method according to claim 7, further comprising:

moving, when receiving a third control instruction sent by the control terminal after all the target goods in the order task are picked, all the collection-goods containers containing the target goods to a second picking area.

11. The goods collection method according to claim 10, further comprising:

obtaining, after receiving the third control instruction, a third identifier of the storage space temporarily storing the collection-goods container containing the target goods, and sending third notification information comprising the third identifier to the control terminal, wherein the third notification information is configured to instruct the control terminal to update a state of the storage spaces corresponding to the third identifier to a state of a free storage space.

12. A goods collection method, executed by a control terminal and comprising:

obtaining an order task comprising target goods, and sending a first control instruction to a goods-container-moving device based on the order task, wherein the first control instruction is configured to instruct the goods-container-moving device to move a target storage-goods container from a shelving unit to a first picking area, the shelving unit is provided with a plurality of storage spaces configured to place a storage-goods container and a collection-goods container, the target storage-goods container is a storage-goods container storing target goods that is to be picked, the collection-goods container is configured to temporarily store goods picked from the storage-goods container, and the first picking area is an area in which the target goods are picked from the target storage-goods container to a collection-goods container; and obtaining a free storage space in which no storage-goods container or collection-goods container is currently placed on the shelving unit, and sending a second control instruction to the goods-container-moving device, wherein the second control instruction is configured to instruct the goods-container-moving device to temporarily store the collection-goods container that completes the picking of the target goods to the free storage space, wherein the free storage space is a storage space configured to place the storage-goods container or the collection-goods container on the shelving unit;

wherein method further comprises:

sending a third control instruction to the goods-container-moving device after all the target goods in the order task are picked, wherein the third control instruction is configured to instruct the goods-container-moving device to move all collection-goods containers containing the target goods to a second picking area, so as to sort the target goods from the collection-goods containers according to the order task.

13. The goods collection method according to claim 12, further comprising:

receiving first notification information that comprises a first identifier and that is sent by the goods-container-moving device, wherein the first identifier is an identifier that is obtained by the goods-container-moving device after receiving the first control instruction and that corresponds to the target storage space storing the target storage-goods container; and updating a state of the storage space corresponding to the first identifier to a state of a free storage space according to the first notification information.

14. The goods collection method according to claim 12, further comprising:

receiving second notification information that comprises a second identifier and that is sent by the goods-container-moving device, wherein the second identifier is an identifier that is obtained by the goods-container-moving device after receiving the second control instruction and that corresponds to the free storage space; and updating a state of the free storage space corresponding to the second identifier to a state of a used storage space according to the second notification information.

15. The goods collection method according to claim 12, further comprising:

receiving first query information sent by the goods-container-moving device after picking of any target goods is completed, and feeding back current state information of the target storage space corresponding to the target storage-goods container that completes the picking of the target goods to the goods-container-moving device based on the first query information; or receiving second query information sent by the goods-container-moving device after picking of any target goods is completed, and feeding back information about the free storage space on the shelving unit to the goods-container-moving device based on the second query information.

16. The goods collection method according to claim 12, further comprising:

receiving third notification information that comprises a third identifier and that is sent by the goods-container-moving device, wherein the third identifier is an identifier that is obtained by the goods-container-moving device after receiving the third control instruction and that corresponds to the storage space temporarily storing the collection-goods container containing the target goods; and updating a state of the storage space corresponding to the third identifier to a state of a free storage space according to the third notification information.

17. A goods-container-moving device, comprising:

at least one processor; and a memory communicatively connected to the at least one processor, wherein the memory stores instructions executable by the at least one processor, and the instructions, when executed by the at least one processor, causes the goods-container-moving device to perform operations of:

moving, when receiving a first control instruction sent by a control terminal based on an order task, a target storage-goods container storing target goods in the order task to a first picking area, wherein the first picking area is an area in which the target goods are picked from the target storage-goods container to a collection-goods container; and temporarily storing, when receiving a second control instruction sent by the control terminal based on a free storage space in which no storage-goods container or collection-goods container is currently placed on a shelving unit, the collection-goods container that completes the picking of the target goods to the free storage space;

wherein the free storage space is a storage space configured to place the storage-goods container or the collection-goods container on the shelving unit, and the storage-goods container is configured to store goods;

sending first query information to the control terminal after picking of any target goods is completed, wherein the first query information is configured to query a current state of the target storage space corresponding to the target storage-goods container that completes the picking of the target goods; receiving current state information of the target storage space fed back by the control terminal based on the first query information; and moving and placing the target storage-goods container corresponding to the picked target goods in the target storage space in response to the target storage space being currently a free storage space; or sending second query information to the control terminal after picking of any target goods is completed, wherein the second query information is configured to query a free storage space on the shelving unit; receiving information about the free storage space on the shelving unit fed back by the control terminal based on the second query information; and moving and placing the target storage-goods container corresponding to the picked target goods in the free storage space in response to there being a free storage space on the shelving unit; and wherein after the information about the free storage space on the shelving unit fed back by the control terminal based on the second query information is received, in response to there being at least two free storage spaces on the shelving unit, determining, based on the at least two free storage spaces on the shelving unit, a free storage space that meets a preset condition, and moving and placing the target storage-goods container in the free storage space that meets the preset condition, wherein the preset condition comprises that a distance for a goods-container-moving device to move to the free storage space is the shortest, or a distance between the free storage space and the first picking area is the shortest.

18. A control terminal, comprising:

at least one processor; and a memory communicatively connected to the at least one processor, wherein the memory stores instructions executable by the at least one processor, and the instructions, when executed by the at least one processor, cause the control terminal to perform operations of:

obtaining an order task comprising target goods, and sending a first control instruction to a goods-container-moving device based on the order task, wherein the first control instruction is configured to instruct the goods-container-moving device to move a target storage-goods container from a shelving unit to a first picking area, the shelving unit is provided with a plurality of storage spaces configured to place a storage-goods container and a collection-goods container, the target storage-goods container is a storage-goods container storing target goods that is to be picked, the collection-goods container is configured to temporarily store goods picked from the storage-goods container, and the first picking area is an area in which the target goods are picked from the target storage-goods container to a collection-goods container;

obtaining a free storage space in which no storage-goods container or collection-goods container is currently placed on the shelving unit, and sending a second control instruction to the goods-container-moving device, wherein the second control instruction is configured to instruct the goods-container-moving device to temporarily store the collection-goods container that completes the picking of the target goods to the free storage space, wherein the free storage space is a storage space configured to place the storage-goods container or the collection-goods container on the shelving unit; and sending a third control instruction to the goods-container-moving device after all the target goods in the order task are picked, wherein the third control instruction is configured to instruct the goods-container-moving device to move all collection-goods containers containing the target goods to a second picking area, so as to sort the target goods from the collection-goods containers according to the order task.

19. A non-transitory computer-readable storage medium, storing computer executable instructions, wherein the computer executable instructions, when executed by a processor, are configured to implement:

moving, when receiving a first control instruction sent by a control terminal based on an order task, a target storage-goods container storing target goods in the order task to a first picking area, wherein the first picking area is an area in which the target goods are picked from the target storage-goods container to a collection-goods container; and temporarily storing, when receiving a second control instruction sent by the control terminal based on a free storage space in which no storage-goods container or collection-goods container is currently placed on a shelving unit, the collection-goods container that completes the picking of the target goods to the free storage space; wherein the free storage space is a storage space configured to place the storage-goods container or the collection-goods container on the shelving unit, and the storage-goods container is configured to store goods, sending first query information to the control terminal after picking of any target goods is completed, wherein the first query information is configured to query a current state of the target storage space corresponding to the target storage-goods container that completes the picking of the target goods; receiving current state information of the target storage space fed back by the control terminal based on the first query information; and moving and placing the target storage-goods container corresponding to the picked target goods in the target storage space in response to the target storage space being currently a free storage space, and wherein after the information about the free storage space on the shelving unit fed back by the control terminal based on the second query information is received, in response to there being at least two free storage spaces on the shelving unit, determining, based on the at least two free storage spaces on the shelving unit, a free storage space that meets a preset condition, and moving and placing the target storage-goods container in the free storage space that meets the preset condition, wherein the preset condition comprises that a distance for a goods-container-moving device to move to the free storage space is the shortest, or a distance between the free storage space and the first picking area is the shortest; or obtaining an order task comprising target goods, and sending a first control instruction to a goods-container-moving device based on the order task, wherein the first control instruction is configured to instruct the goods-container-moving device to move a target storage-goods container from a shelving unit to a first picking area, the shelving unit is provided with a plurality of storage spaces configured to place a storage-goods container and a collection-goods container, the target storage-goods container is a storage-goods container storing target goods that is to be picked, the collection-goods container is configured to temporarily store goods picked from the storage-goods container, and the first picking area is an area in which the target goods are picked from the target storage-goods container to a collection-goods container; obtaining a free storage space in which no storage-goods container or collection-goods container is currently placed on a shelving unit, and sending a second control instruction to the goods-container-moving device, wherein the second control instruction is configured to instruct the goods-container-moving device to temporarily store the collection-goods container that completes the picking of the target goods to the free storage space, wherein the free storage space is a storage space configured to place the storage-goods container or the collection-goods container on the shelving unit; and sending a third control instruction to the goods-container-moving device after all the target goods in the order task are picked, wherein the third control instruction is configured to instruct the goods-container-moving device to move all collection-goods containers containing the target goods to a second picking area, so as to sort the target goods from the collection-goods containers according to the order task.

\* \* \* \* \*